United States Patent
Tezuka et al.

(10) Patent No.: US 12,409,487 B2
(45) Date of Patent: Sep. 9, 2025

(54) METHOD FOR MANUFACTURING RING MEMBER FOR BEARING, AND MOLD FOR INVERSION WORKING

(71) Applicant: NSK Ltd., Tokyo (JP)

(72) Inventors: Kenji Tezuka, Takasaki (JP); Nobuyuki Hagiwara, Takasaki (JP)

(*) Notice: Subject to any disclaimer, the term of this patent is extended or adjusted under 35 U.S.C. 154(b) by 0 days.

(21) Appl. No.: 18/712,251

(22) PCT Filed: Nov. 16, 2022

(86) PCT No.: PCT/JP2022/042608
§ 371 (c)(1),
(2) Date: May 22, 2024

(87) PCT Pub. No.: WO2023/095701
PCT Pub. Date: Jun. 1, 2023

(65) Prior Publication Data
US 2025/0010355 A1    Jan. 9, 2025

(30) Foreign Application Priority Data
Nov. 24, 2021   (JP) ................. 2021-189961

(51) Int. Cl.
*B21D 53/10* (2006.01)
(52) U.S. Cl.
CPC ................... *B21D 53/10* (2013.01)
(58) Field of Classification Search
CPC .......... B21K 1/04; B21D 22/26; B21D 22/28; B21D 53/10; B21D 53/16; B21D 53/12
See application file for complete search history.

(56) References Cited

U.S. PATENT DOCUMENTS

2008/0089631 A1   4/2008  Kobayashi et al.

FOREIGN PATENT DOCUMENTS

| JP | 2006-090407 | 4/2006 |
| JP | 2006-097809 | 4/2006 |
| JP | 2006-123003 | 5/2006 |
| JP | 2006-341255 | 12/2006 |

(Continued)

OTHER PUBLICATIONS

English translation of JP 2009-226422 from espacenet.com (Year: 2009).*

(Continued)

*Primary Examiner* — Moshe Wilensky
(74) *Attorney, Agent, or Firm* — SOEI PATENT & LAW FIRM

(57) ABSTRACT

A method for manufacturing a bearing ring member includes an inversion step of deforming a workpiece having an annular shape by sandwiching the workpiece between a punch disposed on a first side in a predetermined direction and a die disposed on a second side. The punch has a first R surface formed in a circular arc shape. The die has a second R surface formed in a circular arc shape, and a tapered surface inclined with respect to the predetermined direction. The inversion step includes a first step of deforming the workpiece using the punch and the die in a state where the first R surface and the second R surface are in contact with the workpiece, and a second step of deforming the workpiece using the punch and the die in a state where the first R surface and the tapered surface are in contact with the workpiece.

18 Claims, 14 Drawing Sheets

(56) References Cited

FOREIGN PATENT DOCUMENTS

| JP | 2009-226422 | 10/2009 |
| JP | 2010-188355 | 9/2010 |
| JP | 2020-022987 | 2/2020 |
| JP | 2020-122569 | 8/2020 |

OTHER PUBLICATIONS

International Search Report dated Feb. 7, 2023 for PCT/JP2022/042611.
International Search Report dated Feb. 7, 2023 for PCT/JP2022/042608.
Hideaki Kudo, "Fundamental Mechanical Engineering Complete Book 3: Plasticity", Morikita Publishing Co., Ltd., May 15, 1968, p. 18-p. 19.
International Preliminary Report on Patentability with Written Opinion dated Jun. 6, 2024 for PCT/JP2022/042611.
International Preliminary Report on Patentability with Written Opinion dated Jun. 6, 2024 for PCT/JP2022/042608.
SOEI Patent and Law Firm, Statement of Related Matters, dated Jun. 28, 2024.

\* cited by examiner (a)

(b)

(a)

(b)

METHOD FOR MANUFACTURING RING MEMBER FOR BEARING, AND MOLD FOR INVERSION WORKING

CROSS-REFERENCE TO RELATED APPLICATIONS

This application is a 35 U.S.C. § 371 national phase application of PCT/JP2022/042608, filed on Nov. 16, 2022, which claims priority to Japanese Patent Application No. 2021-189961, filed on Nov. 24, 2021.

TECHNICAL FIELD

One aspect of the present disclosure relates to a method for manufacturing a bearing ring member and a mold for inversion working.

BACKGROUND ART

Patent Literature 1 describes a method for manufacturing a ring member used to manufacture an inner ring or an outer ring of a bearing. In this manufacturing method, the ring member is formed through a step of performing inversion working in which a workpiece having an annular shape is sandwiched between a punch and a die to change the direction of a cross section by 90 degrees. The punch has a tapered shape, and the die has a composite R shape in which a plurality of R surfaces having different radiuses are combined. Patent Literatures 2 to 5 also describe that a bearing ring member is formed by the same inversion working.

CITATION LIST

Patent Literature

Patent Literature 1: Japanese Unexamined Patent Publication No. 2006-341255
Patent Literature 2: Japanese Unexamined Patent Publication No. 2006-090407
Patent Literature 3: Japanese Unexamined Patent Publication No. 2006-097809
Patent Literature 4: Japanese Unexamined Patent Publication No. 2006-123003
Patent Literature 5: Japanese Unexamined Patent Publication No. 2020-022987

SUMMARY OF INVENTION

Technical Problem

In the manufacturing method described above, it is not easy to design the tapered shape of the punch and the composite R shape of the die such that inversion working can be satisfactorily performed, and since design relies on experience, the difference in design between designers is large, which is a problem. When the difference between designers is large, design work is concentrated on a specific designer, and it is concerned that work efficiency decreases.

Therefore, an object of one aspect of the present disclosure is to provide a method for manufacturing a bearing ring member, which can facilitate the design and manufacture of the bearing ring member through inversion working, and a mold for inversion working.

Solution to Problem

According to one aspect of the present disclosure, there is provided a method for manufacturing a bearing ring member (ring member for bearing) having a cylindrical shape, the method including: an inversion step of deforming a workpiece having an annular shape by sandwiching the workpiece between a punch disposed on a first side in a predetermined direction and a die disposed on a second side opposite to the first side. The punch includes a first R (Radius) surface formed in a circular arc shape in a cross section parallel to the predetermined direction. The die includes a second R (Radius) surface formed in a circular arc shape in a cross section parallel to the predetermined direction, and a tapered surface formed on the second side of the second R surface and inclined to approach a center side in a radial direction as the tapered surface extends toward the second side. The inversion step includes a first step of deforming the workpiece using the punch and the die in a state where the first R surface and the second R surface are in contact with the workpiece, and a second step of deforming the workpiece using the punch and the die in a state where the first R surface and the tapered surface are in contact with the workpiece, after the first step.

In the method for manufacturing a bearing ring member, the punch includes the first R surface formed in a circular arc shape in a cross section parallel to the predetermined direction, and the die includes the second R surface formed in a circular arc shape in a cross section parallel to the predetermined direction, and the tapered surface formed on the second side of the second R surface and inclined to approach the center side in the radial direction as the tapered surface extends toward the second side. In the inversion step, after the first step of deforming the workpiece using the punch and the die in a state where the first R surface and the second R surface are in contact with the workpiece is performed, the second step of deforming the workpiece using the punch and the die in a state where the first R surface and the tapered surface are in contact with the workpiece is performed. Since the punch and the die have simple shapes or a combination shape thereof in such a manner, whether or not inversion working can be satisfactorily performed can be determined in advance based on geometric calculations. Therefore, according to the method for manufacturing a bearing ring member, the design and manufacture of the bearing ring member can be facilitated.

In the first step, no sliding may occur between the workpiece and the second R surface, and in the second step, sliding may occur between the workpiece and the tapered surface. In this case, the inversion working of the workpiece can be satisfactorily performed.

A bending moment acting on the workpiece in the first step may be smaller than a predicted value M of a limiting bending moment of the workpiece calculated using Formula (1). In this case, no sliding occurs between the workpiece and the die in the first step, and the workpiece can be satisfactorily stood up.

$$M = \frac{W_W \times t^2}{4} Y \qquad (1)$$

In Formula (1), $W_W$ is a width of the workpiece. $t$ is a thickness of the workpiece, and $Y$ is a yield stress of the workpiece.

An inclination angle of the tapered surface with respect to the predetermined direction may be smaller than 30 degrees, and Formula (2) may be satisfied at a time that an inclination angle $\theta$ of the workpiece with respect to the predetermined direction is 30 degrees. In this case, the occurrence of the biting of the punch into the workpiece can be suppressed, and the inversion working of the workpiece can be satisfactorily performed. Details of biting will be described later.

$$Z_d < W_W \times A \quad (2)$$

In Formula (2), $Z_d$ is a distance between a radially inner edge of an end portion on the second side of the workpiece and a contact point between the workpiece and the first R surface. $W_W$ is a width of the workpiece, and A is a constant of 0.2 or more and 0.6 or less.

The punch may include a main body portion having a columnar shape on which the first R surface is formed. An inclination angle of the tapered surface with respect to the predetermined direction may be smaller than 30 degrees. Formula (3) may be satisfied at a time that an inclination angle θ of the workpiece with respect to the predetermined direction is 30 degrees. In this case, the occurrence of the biting of the punch into the workpiece can be suppressed, and the inversion working of the workpiece can be satisfactorily performed.

$$\{(D_p/2 - r_p) - d_{bi}/2\} + 2\pi r_p \frac{90° - \theta}{360°} < \frac{D_{bo} - d_{bi}}{2} \times A \quad (3)$$

In Formula (3), $D_p$ is a diameter of the main body portion, $r_p$ is a radius of the first R surface, $d_{bi}$ is an inner diameter of the workpiece. $D_{bo}$ is an outer diameter of the workpiece, and A is ⅖.

The punch may include a main body portion having a columnar shape on which the first R surface is formed, and a protruding portion formed on the first side of the main body portion and protruding outward in a radial direction with respect to the main body portion. At a start of the second step, a radially inner edge of an end portion on the first side of the workpiece may be located inside an outer edge of the protruding portion in the radial direction. In this case, the workpiece can be reliably pushed in by the protruding portion of the punch, and the inversion working of the workpiece can be satisfactorily performed.

The punch may include a main body portion having a columnar shape on which the first R surface is formed, and a protruding portion formed on the first side of the main body portion and protruding outward in a radial direction with respect to the main body portion. Formula (4) may be satisfied at a start of the second step. In this case, the workpiece can be reliably pushed in by the protruding portion of the punch, and the inversion working of the workpiece can be satisfactorily performed.

$$D_{pL}/2 > (D_h/2 - r_d \cos \alpha) - \{t/\cos\alpha - (Z_D + t \tan \alpha)\sin \alpha\} \quad (4)$$

In Formula (4), $D_{pL}$ is a diameter of the protruding portion, $D_h$ is a diameter of an opening of the die defined by the second R surface, $r_d$ is a radius of the second R surface, α is an inclination angle of the tapered surface with respect to the predetermined direction, t is a thickness of the workpiece, and $Z_D$ is a distance between a radially outer edge of an end portion on the first side of the workpiece and a contact point between the workpiece and the second R surface.

The inversion step may be performed in a state where a surface roughness of a first region of the first R surface, which comes into contact with the workpiece in the second step, is larger than a surface roughness of a second region of the first R surface other than the first region. In this case, the occurrence of the biting of the punch into the workpiece can be further suppressed, and the inversion working of the workpiece can be satisfactorily performed.

The inversion step may be performed in a state where a surface roughness of the tapered surface is larger than a surface roughness of the second R surface. In this case, the occurrence of the biting of the punch into the workpiece can be further suppressed, and the inversion working of the workpiece can be satisfactorily performed.

The inversion step may be performed in a state where a surface roughness of a first region of the first R surface, which comes into contact with the workpiece in the second step, is larger than a surface roughness of a second region of the first R surface other than the first region and a surface roughness of the tapered surface is larger than a surface roughness of the second R surface. In this case, the occurrence of the biting of the punch into the workpiece can be further suppressed, and the inversion working of the workpiece can be satisfactorily performed.

The inversion step may be performed in a state where a surface roughness of a second region of the first R surface other than a first region which comes into contact with the workpiece in the second step is larger than a surface roughness of the first region of the first R surface. In this case, the workpiece can be more reliably pushed in by the protruding portion of the punch, and the inversion working of the workpiece can be satisfactorily performed.

The inversion step may be performed in a state where a surface roughness of the second R surface is larger than a surface roughness of the tapered surface. In this case, the workpiece can be more reliably pushed in by the protruding portion of the punch, and the inversion working of the workpiece can be satisfactorily performed.

The inversion step may be performed in a state where a surface roughness of a second region of the first R surface other than a first region which comes into contact with the workpiece in the second step is larger than a surface roughness of the first region of the first R surface and a surface roughness of the second R surface is larger than a surface roughness of the tapered surface. In this case, the workpiece can be more reliably pushed in by the protruding portion of the punch, and the inversion working of the workpiece can be satisfactorily performed.

The method for manufacturing a bearing ring member according to one aspect of the present disclosure may further include a step of polishing at least one of the punch and the die to obtain the above-described state, before the inversion step. In this case, it is possible to suppress a situation where the above-described state is no longer satisfied due to wear of at least one of the punch and the die, thereby causing a defect.

The punch may further includes an outer peripheral surface formed on the first side of the first R surface. The die may further includes an inner peripheral surface formed on the second side of the tapered surface. The inversion step may further include a third step of applying ironing to the workpiece by sandwiching the workpiece between the outer peripheral surface and the inner peripheral surface after the second step. In standard inversion working, the thickness of the radially inner portion of the workpiece decreases, and the thickness of the radially outer portion increases. In this case, by performing ironing between the outer peripheral surface of the punch and the inner peripheral surface of the die, the roundness of the obtained bearing ring member can be improved.

A gap between the outer peripheral surface and the inner peripheral surface in the third step may be set to be equal to a thickness of the workpiece. In this case, the thickness of the obtained bearing ring member can be matched to the thickness of the workpiece.

A gap between the outer peripheral surface and the inner peripheral surface in the third step may be set to be smaller than a thickness of the workpiece. In this case, the thickness of the obtained bearing ring member can be matched to the thickness of the radially inner portion of the workpiece, of which the thickness decreases.

According to one aspect of the present disclosure, there is provided a mold for inversion working for manufacturing a bearing ring member having a cylindrical shape, which is used in inversion working in which a workpiece having an annular shape is deformed by sandwiching the workpiece between a punch disposed on a first side in a predetermined direction and a die disposed on a second side opposite to the first side, the mold including: the punch including a first R surface formed in a circular arc shape in a cross section parallel to the predetermined direction; and the die including a second R surface formed in a circular arc shape in a cross section parallel to the predetermined direction, and a tapered surface formed on the second side of the second R surface and inclined to approach a center side in a radial direction as the tapered surface extends toward the second side.

In the mold for inversion working, the punch includes the first R surface formed in a circular arc shape in a cross section parallel to the predetermined direction, and the die includes the second R surface formed in a circular arc shape in a cross section parallel to the predetermined direction, and the tapered surface formed on the second side of the second R surface and inclined to approach the center side in the radial direction as the tapered surface extends toward the second side. Accordingly, during inversion working, after a first step of deforming the workpiece using the punch and the die in a state where the first R surface and the second R surface are in contact with the workpiece is performed, a second step of deforming the workpiece using the punch and the die in a state where the first R surface and the tapered surface are in contact with the workpiece can be performed. Since the punch and the die have simple shapes or a combination shape thereof in such a manner, whether or not inversion working can be satisfactorily performed can be determined in advance based on geometric calculations. Therefore, according to the mold for inversion working, the design and manufacture of the bearing ring member can be facilitated.

Advantageous Effects of Invention

According to one aspect of the present disclosure, it is possible to provide the method for manufacturing a bearing ring member, which can facilitate the design and manufacture of the bearing ring member through inversion working, and the mold for inversion working.

BRIEF DESCRIPTION OF DRAWINGS

FIG. 12(a) is a cross-sectional view of the punch and the workpiece at the start of a second step, and FIG. 12(b) is a cross-sectional view of the die and the workpiece at the start of the second step.

FIG. 13(a) is a cross-sectional view of the punch and the workpiece at the start of the second step, and FIG. 13(b) is a cross-sectional view of the die and the workpiece at the start of the second step.

DESCRIPTION OF EMBODIMENTS

Hereinafter, an embodiment of the present disclosure will be described in detail with reference to the drawings. In the following description, the same reference signs are used for the same or equivalent elements, and duplicate descriptions will be omitted.

Figure 1:
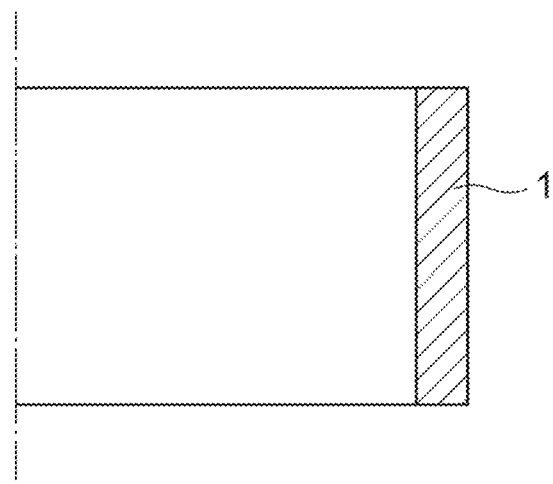
FIG. 1(a) is a cross-sectional view of a bearing ring member.
FIG. 1(b) is a cross-sectional view of a workpiece.
Figure 1:
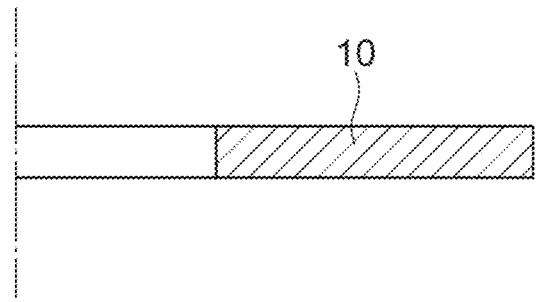

In a method for manufacturing a bearing ring member according to the embodiment, a bearing ring member 1 (ring member 1 for bearing) shown in FIG. 1(a) is manufactured from a workpiece 10 shown in FIG. 1(b). The bearing ring member 1 can be used, for example, as an inner ring or an outer ring of a bearing. The manufactured bearing ring member 1 itself may be used as an inner ring or an outer ring, or an inner ring or an outer ring may be manufactured by further processing the bearing ring member 1. The bearing ring member 1 is formed in a cylindrical shape. The bearing to which the bearing ring member 1 is applied may be any bearing, and for example, may be a needle bearing, a cylindrical roller bearing, a tapered roller bearing, a ball bearing, or the like. The workpiece 10 is formed in a disk plate shape. FIGS. 1(a) and 1(b) show cross sections of the bearing ring member 1 and the workpiece 10, which are parallel to an axial direction.

Figure 2:
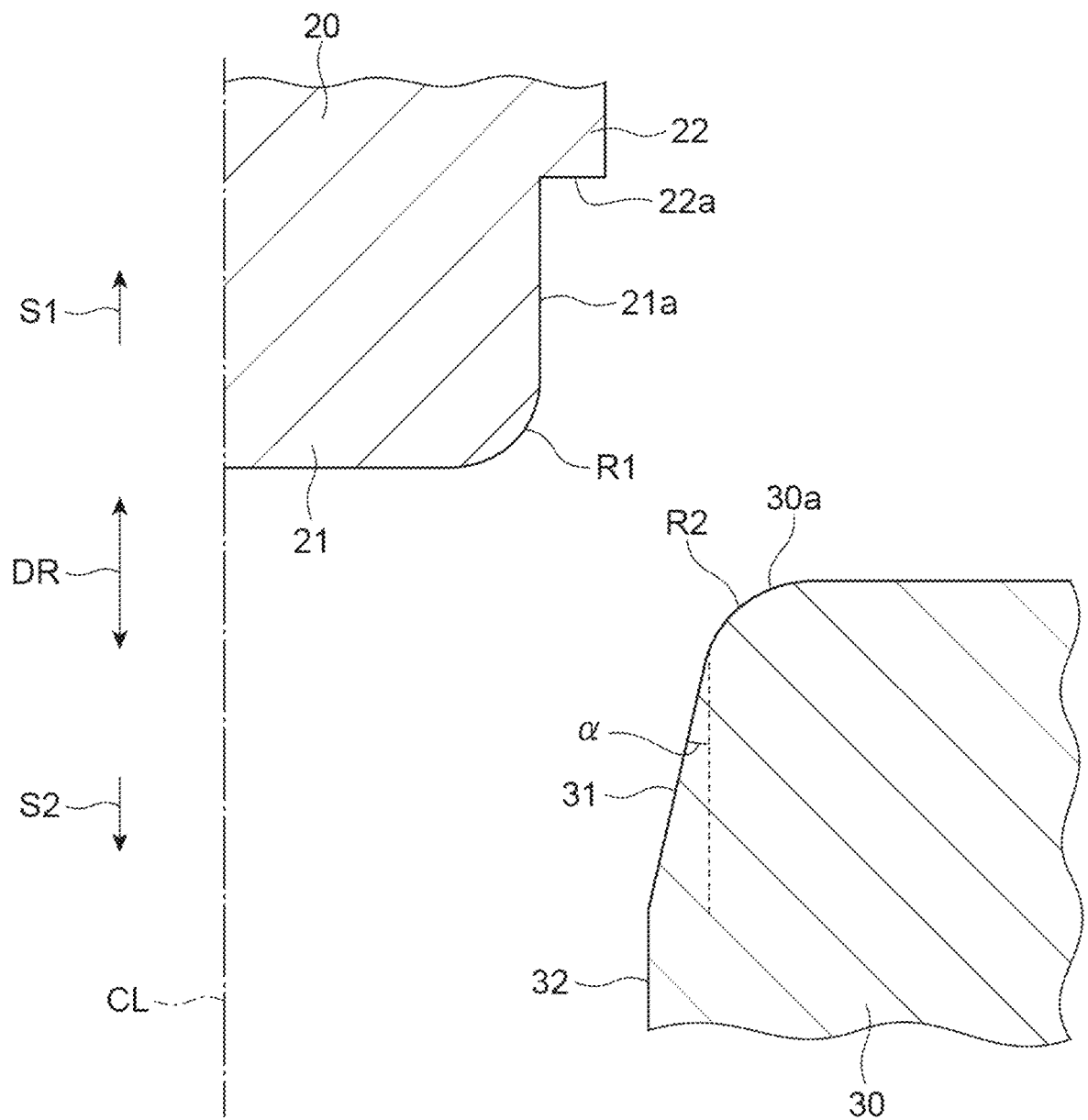
FIG. 2 is a cross-sectional view of a punch and a die.

FIG. 2 is a cross-sectional view of a punch 20 and a die 30 (mold for inversion working) used in the method for manufacturing a bearing ring member according to the embodiment. This manufacturing method includes an inversion step of deforming the workpiece 10 by sandwiching the workpiece 10 between the punch 20 and the die 30. The direction of the cross section of the workpiece 10 is changed by 90 degrees by the inversion step, and the bearing ring member 1 is formed. Before the start of the inversion step, the punch 20 is disposed on a first side S1 in a direction DR (predetermined direction) with respect to the die 30, and the die 30 is disposed on a second side (side opposite to the first side S1) S2 in the direction DR with respect to the punch 20. Then, by moving (descending) the punch 20 along the direction DR and bringing the punch 20 closer to the die 30, the workpiece 10 is sandwiched between the punch 20 and the die 30, and the workpiece 10 is subjected to inversion working. The punch 20 and the die 30 have a common center line CL, and each of the punch 20 and the die 30 has a uniform cross-sectional shape in a radial direction.

[Shape of Punch and Die]

As shown in FIG. 2, the punch 20 includes a main body portion 21 and a protruding portion 22. The main body portion 21 is formed in a substantially columnar shape having an axis parallel to the direction DR. A first R surface R1 is formed at an outer edge portion of a surface on the second side S2 of the main body portion 21. The first R surface R1 is a curved surface formed by rounding off a corner on the second side S2 of the main body portion 21, and is formed in a circular arc shape in a cross section (FIG. 2) parallel to the direction DR. The first R surface R1 extends over the entire circumference of the outer edge portion. A central angle of the first R surface R1 in a cross section parallel to the direction DR is, for example, 90 degrees. The main body portion 21 has an outer peripheral surface 21a that is continuous with the first side S1 of the first R surface R1.

The protruding portion 22 is formed on the first side S1 of the main body portion 21, and protrudes outward in the radial direction with respect to the main body portion 21. The protruding portion 22 is formed, for example, in a columnar shape having a diameter larger than a diameter of the main body portion 21. The protruding portion 22 has a stepped surface 22a facing the second side S2. The stepped surface 22a is continuous with the outer peripheral surface 21a of the main body portion 21.

The die 30 is formed, for example, in a substantially cylindrical shape having an axis parallel to the direction DR. The die 30 has a second R surface R2, a tapered surface 31, and an inner peripheral surface 32. The second R surface R2 is formed at an inner edge portion of a surface on the first side S1 of the die 30. The second R surface R2 is a curved surface formed by rounding off a corner on the first side S1 of the die 30, and is formed in a circular arc shape in a cross section (FIG. 2) parallel to the direction DR. The second R surface R2 extends over the entire circumference of the inner edge portion. A central angle of the second R surface R2 in a cross section parallel to the direction DR is, for example, (90−α) degrees when an inclination angle of the tapered surface 31 with respect to the direction DR is α. The second R surface R2 defines an opening 30a of the die 30, which opens to the first side S1.

The tapered surface 31 is continuous with the second side S2 of the second R surface R2, and is inclined to approach a center side in the radial direction as the tapered surface 31 extends toward the second side S2. The inclination angle α of the tapered surface 31 with respect to the direction DR is, for example, smaller than 30 degrees. The inner peripheral surface 32 is continuous with the second side S2 of the tapered surface 31.

[Inversion Step]

Figure 6:
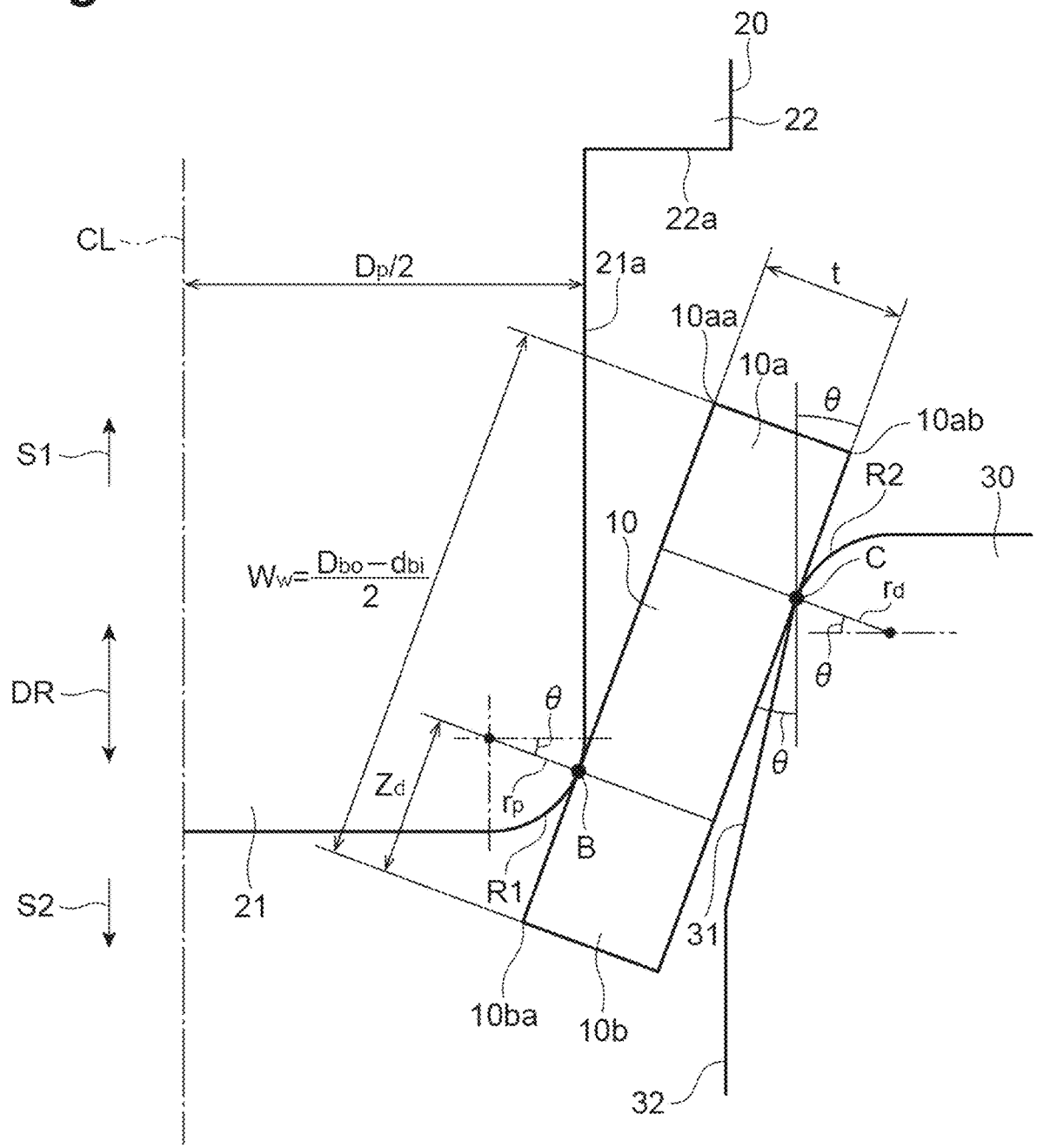
FIG. 6 is a cross-sectional view in a state where the inclination angle of the workpiece is 30 degrees.
Figure 9:
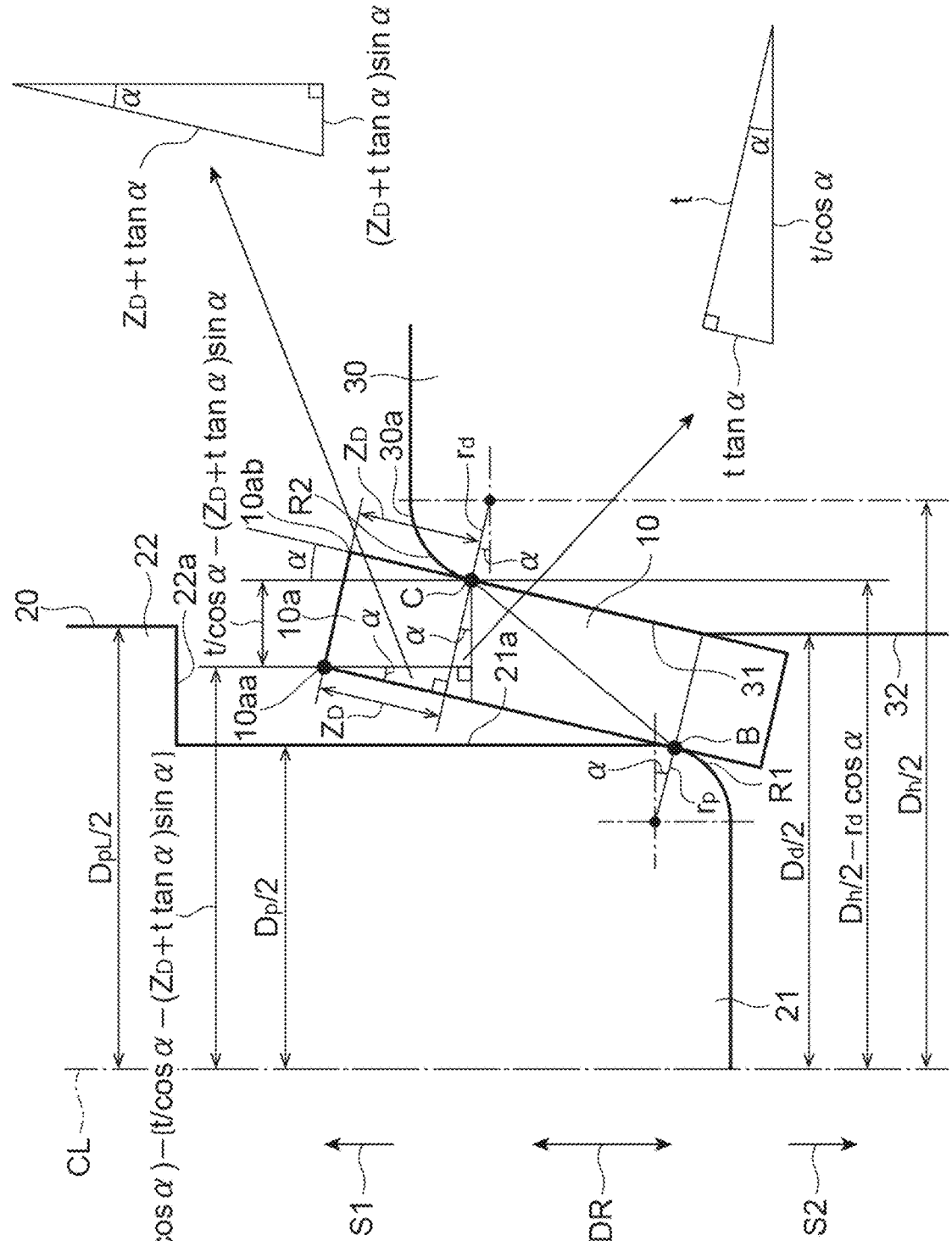
FIG. 9 is a cross-sectional view in a state where the inclination angle of the workpiece is equal to the inclination angle of the tapered surface.

As described above, in the inversion step, the workpiece 10 is sandwiched between the punch 20 and the die 30, and the workpiece 10 is subjected to inversion working. More specifically, the inversion step includes a first step and a second step in order. In the first step, the workpiece 10 is deformed by the punch 20 and the die 30 in a state where the first R surface R1 and the second R surface R2 are in contact with the workpiece 10 (for example, as shown in FIG. 6). In the second step, the workpiece 10 is deformed by the punch 20 and the die 30 in a state where the first R surface R1 and the tapered surface 31 are in contact with the workpiece 10 (for example, as shown in FIG. 9).

In the first step, the workpiece 10 is deformed to stand up. In the second step, the workpiece 10 slides on the tapered surface 31, and the workpiece 10 is drawn into the inside of the die 30, together with the punch 20. After the start of the second step, when the punch 20 further descends, the stepped surface 22a of the protruding portion 22 of the punch 20 comes into contact with an end portion 10a on the first side S1 of the workpiece 10, and the workpiece 10 is pushed in by the protruding portion 22. Thereafter, the workpiece 10 is disposed between the outer peripheral surface 21a of the main body portion 21 of the punch 20 and the inner peripheral surface 32 of the die 30. The bearing ring member 1 having a cylindrical shape is obtained through the above steps. Hereinafter, conditions for satisfactorily performing inversion working will be described.

[First Condition]

Figure 3:
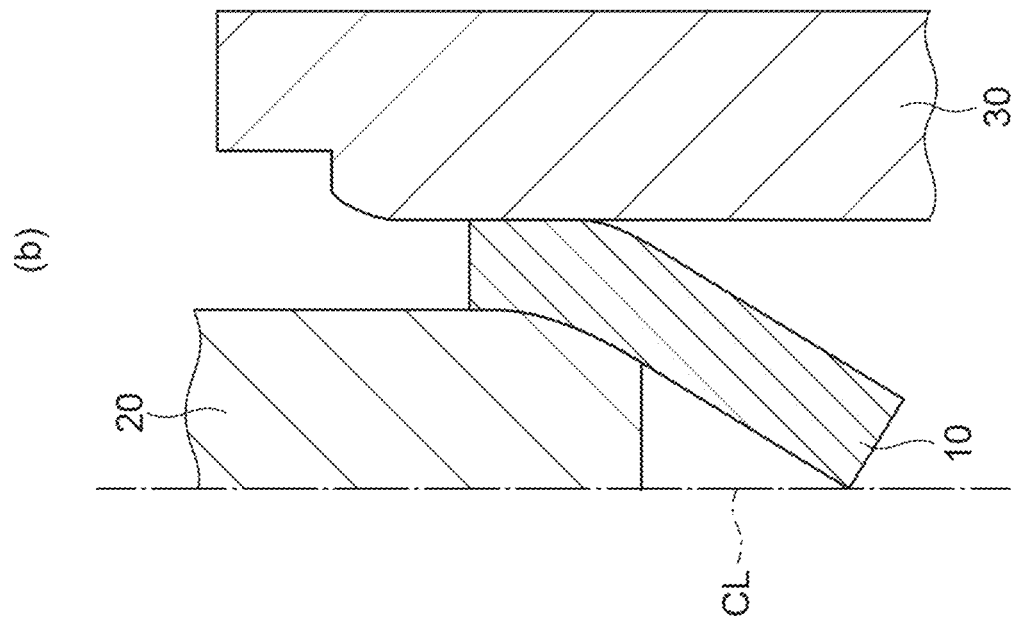
FIGS. 3(a) and 3(b) are views showing an example of a state where the punch bites into the workpiece.
Figure 3:
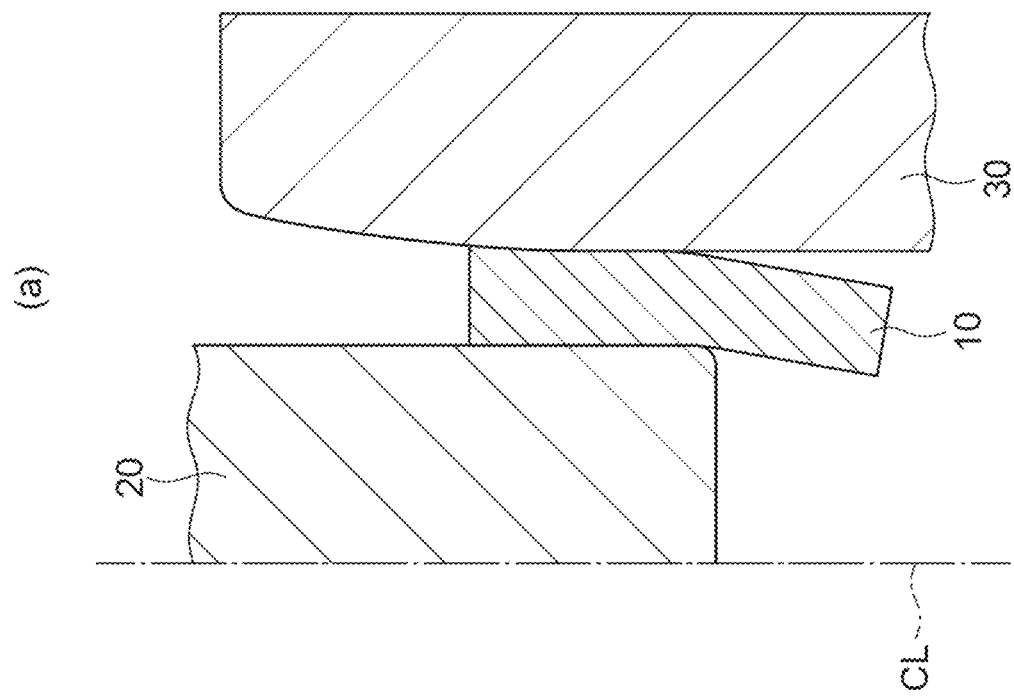

Examples of a first condition include that the punch 20 does not bite into the workpiece 10 in the first step, and that the workpiece 10 does not slide off due to being caught on the die 30. In the first step, the punch 20 needs to continue pushing a radially inner portion of the workpiece 10 while a radially outer portion of the workpiece 10 is caught on the die 30. When such an operation is not performed well and biting occurs, as shown in FIGS. 3(a) and 3(b), the workpiece 10 is drawn into the inside of the die 30 in a state where the workpiece 10 is deformed into an unintended shape, which is a risk. Therefore, in the method for manufacturing a bearing ring member according to the embodiment, a first condition formula to be described below is satisfied, and the occurrence of biting is suppressed.

Figure 4:
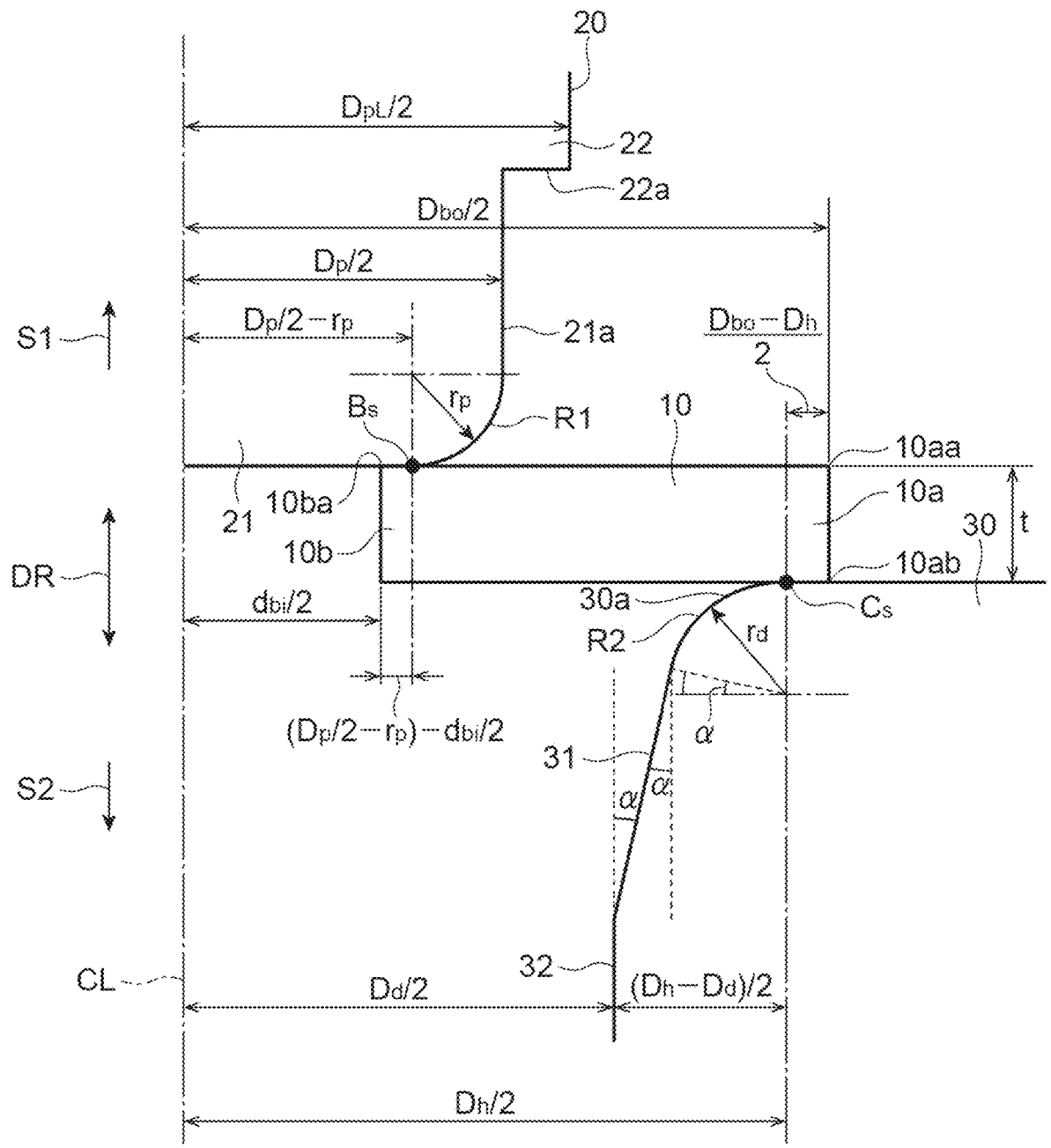
FIG. 4 is a cross-sectional view at the start of a first step.
Figure 5:
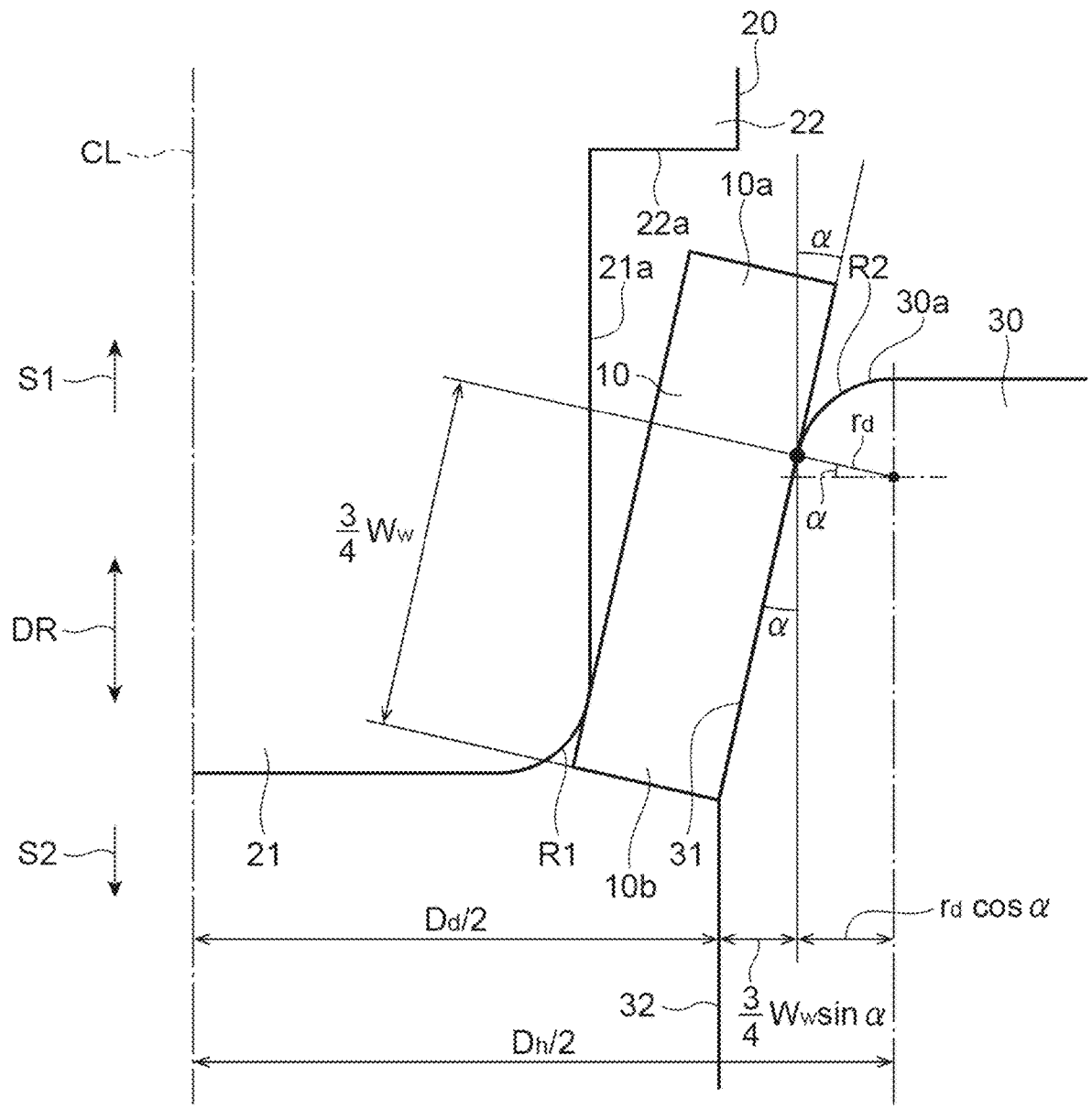
FIG. 5 is a cross-sectional view in a state where an inclination angle of the workpiece is equal to an inclination angle of a tapered surface.

FIG. 4 is a cross-sectional view taken along a plane parallel to the direction DR at the start of the first step. FIG. 5 is a cross-sectional view in a state where an inclination angle θ of the workpiece 10 with respect to the direction DR is equal to the inclination angle α of the tapered surface 31. FIG. 6 is a cross-sectional view in a state where the inclination angle θ of the workpiece 10 between FIGS. 4 and 5 is 30 degrees. FIGS. 7(a) and 7(b) are views for describing the position of a contact point B between the workpiece 10 and the first R surface R1. In FIGS. 4 to 6, hatching indicating cross sections is omitted.

The present inventors have found that if the following formula (5) (first condition formula) is satisfied when the inclination angle θ of the workpiece 10 is 30 degrees, the occurrence of the biting of the punch 20 into the workpiece 10 can be suppressed. In the present embodiment, the inclination angle θ of the workpiece 10 is 30 degrees in the first step.

$$Z_d < W_W \times A \qquad (5)$$

In the above formula (5), $Z_d$ is a distance between a radially inner edge 10ba of an end portion 10b on the second side S2 of the workpiece 10 and the contact point B between the workpiece 10 and the first R surface R1, $W_W$ is a width of the workpiece 10, and A is a constant of 0.2 or more and 0.6 or less.

The first condition formula represents that when the inclination angle θ shown in FIG. 6 is 30 degrees, the contact point B is located within the range of a length, which is obtained by multiplying the width $W_W$ of the workpiece 10 by the constant A, from the edge 10ba of the workpiece 10. The constant A can be determined, for example, by experiment and/or simulation depending on the shapes, materials, and the like of the workpiece 10, the punch 20, and the die 30. In this example, the constant A is set to ⅖. An inclination angle θ of 30 degrees is, for example, a boundary value at which the workpiece 10 starts sliding on the die 30 (second R surface R2). Namely, in this example, until the inclination angle decreases to 30 degrees, no sliding occurs between the workpiece 10 and the second R surface R2, and after the inclination angle becomes smaller than 30 degrees, sliding occurs between the workpiece 10 and the second R surface R2.

Formula (5) will be further described. Contact points between the workpiece 10 and both the first R surface R1 and the second R surface R2 at the start of the first step shown in FIG. 4 are Bs and Cs, respectively. At the start of the first step, the inclination angle θ of the workpiece 10 is 90 degrees, and the workpiece 10 is sandwiched between the punch 20 and the die 30 in a state where main surfaces of the workpiece 10 are perpendicular to the direction DR.

An outer diameter of the workpiece 10 is $D_{bo}$, an inner diameter of the workpiece 10 is $d_{bi}$, and a thickness of the workpiece 10 is t. The width $W_W$ of the workpiece 10 is expressed as $W_W=(D_{bo}-d_{bi})/2$ using the outer diameter $D_{bo}$ and the inner diameter $d_{bi}$. A diameter of the main body portion 21 of the punch 20 is $D_p$, a radius of the first R surface R1 is $r_p$, and a diameter of the protruding portion 22 of the punch 20 is $D_{pL}$. An inner diameter of the die 30 (distance between the inner peripheral surfaces 32) is $D_d$, a radius of the second R surface R2 is $r_d$, and a diameter of the opening 30a is $D_h$. In this example, the diameter $D_{pL}$ of the protruding portion 22 and the inner diameter $D_d$ of the die 30 are set to be substantially equal. The outer diameter $D_{bo}$ of the workpiece 10) is, for example, approximately 10 mm to 60 mm.

Figure 7:
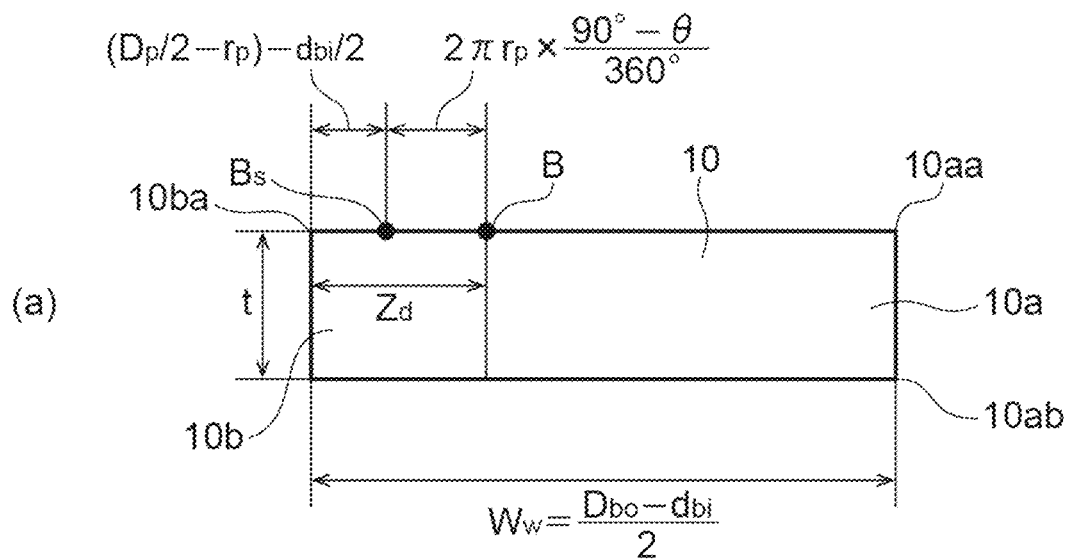
FIGS. 7(a) and 7(b) are views for describing the position of a contact point between the workpiece and a first R surface.
Figure 7:
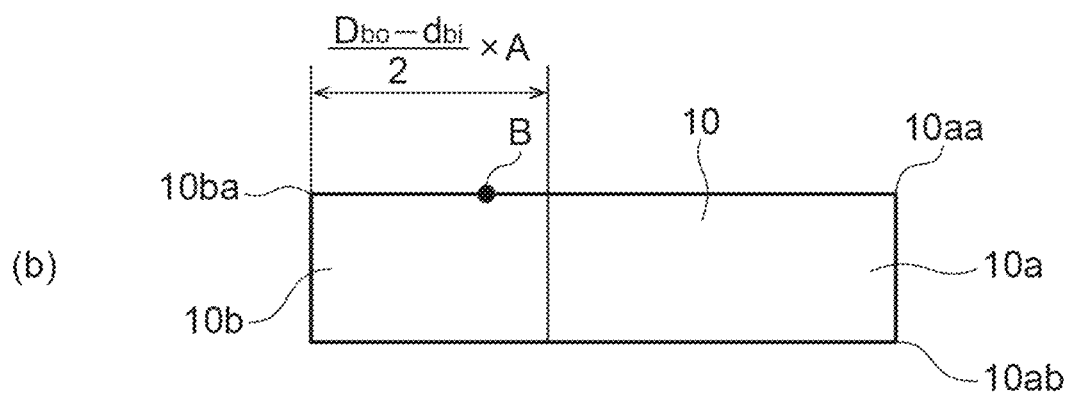

As shown in FIG. 4, a distance between the edge 10ba of the workpiece 10 and the point Bs is expressed as $(D_p/2-r_p)-d_{bi}/2$. Meanwhile, as shown in FIGS. 6 and 7, a distance between the point Bs and the contact point B is expressed as $2\pi r_p \times (90°-\theta)/360°$. $(90°-\theta)$ is an angle at which the workpiece 10 is inclined from the start of the first step until the inclination angle θ reaches 30 degrees, and $2\pi r_p \times (90°-\theta)/360°$ is a length of a circular arc with the radius $r_p$ corresponding to the angle. Therefore, the distance $Z_d$ between the edge 10ba and the contact point B is expressed as $Z_d=\{(D_p/2-r_p)-d_{bi}/2\}+2\pi r_p \times (90°-\theta)/360°$. As described above, since the width $W_W$ of the workpiece 10 is expressed as $W_W=(D_{bo}-d_{bi})/2$, the first condition formula can also be expressed as in the following formula (6). Namely, if the following formula (6) is satisfied when the inclination angle θ of the workpiece 10 is 30 degrees, a state where the occurrence of the biting of the punch 20 into the workpiece 10 while the workpiece 10 is caught on the die 30 is suppressed is achieved. As described above, in this example, the constant A is set to ⅖.

$$\{(D_p/2 - r_p) - (d_{bi}/2)\} + 2\pi r_p \frac{90° - \theta}{360°} < \frac{D_{bo} - d_{bi}}{2} \times A \quad (6)$$

[Second Condition]

Figure 8:
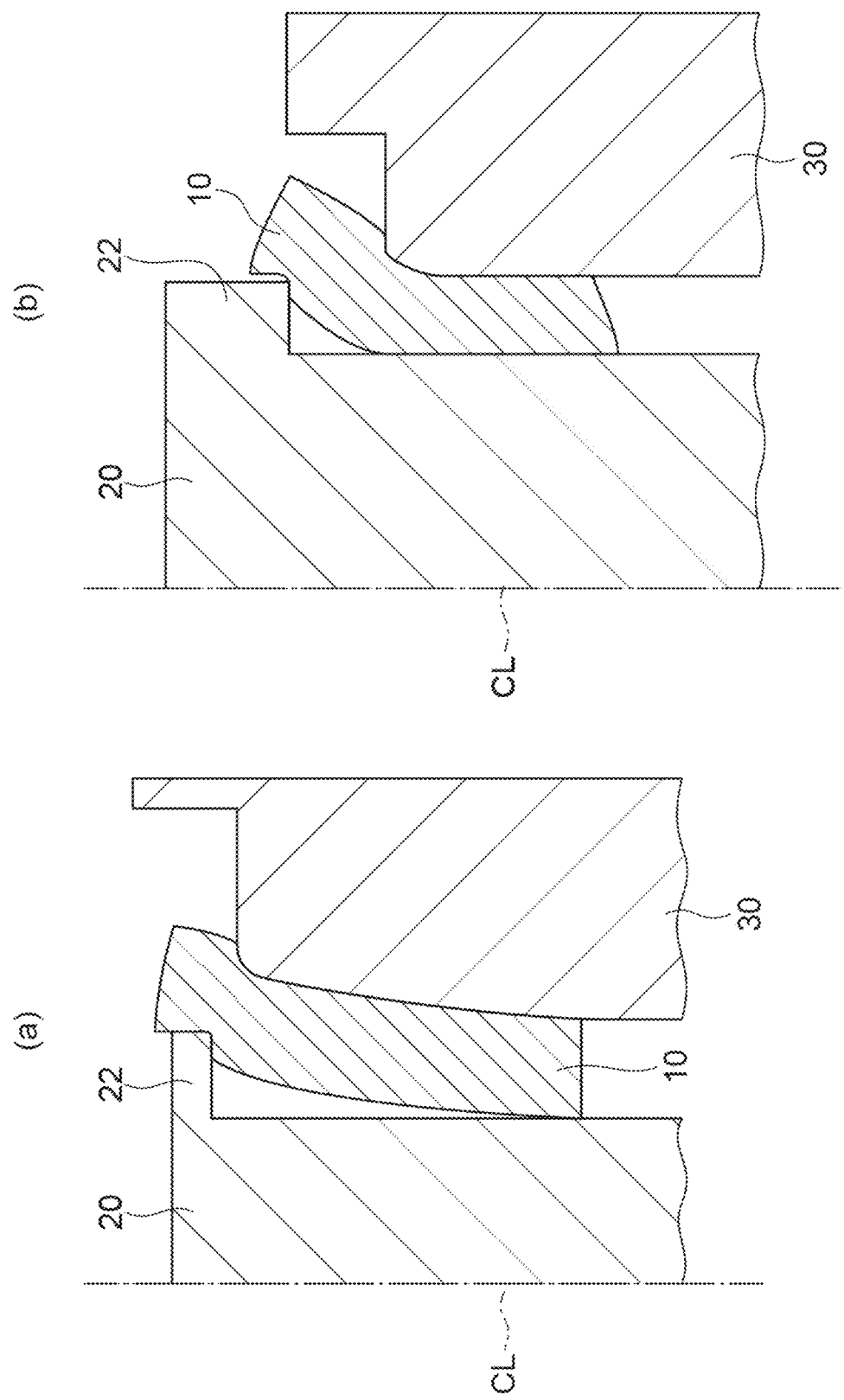
FIGS. 8(a) and 8(b) are views showing an example of a state where the workpiece is not pushed in by a protruding portion of the punch.

Examples of a second condition include that an end surface of the workpiece 10 can be pushed in by the protruding portion 22 of the punch 20 in the second step. When the end surface of the workpiece 10 cannot be pushed in by the protruding portion 22 in the second step, as shown in FIGS. 8(a) and 8(b), the workpiece 10 is crushed by the protruding portion 22, which is a risk. Therefore, in the method for manufacturing a bearing ring member according to the embodiment, a second condition formula described below as Formula (7) is satisfied, and the pushing of the workpiece 10 by the protruding portion 22 is ensured.

Figure 10:
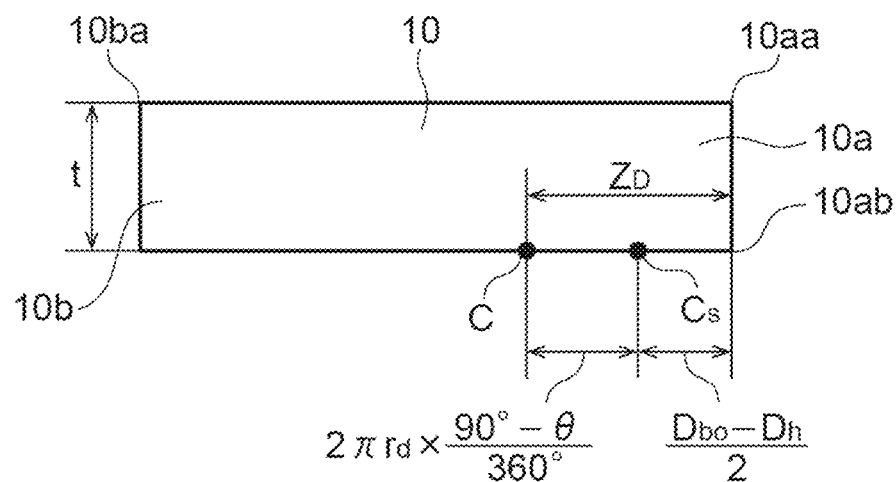
FIG. 10 is a view for describing the position of a contact point between the workpiece and a second R surface.

FIG. 9 is a cross-sectional view in a state where the inclination angle θ of the workpiece 10 is equal to the inclination angle α of the tapered surface 31. FIG. 10 is a view for describing the position of a contact point C between the workpiece 10 and the second R surface R2. In FIG. 9, hatching indicating cross sections is omitted.

The present inventors have found that if the following formula (7) (second condition formula) is satisfied at the start of the second step (the state shown in FIG. 9), the workpiece 10 can be reliably pushed in by the protruding portion 22.

$$D_{pL}/2 > (D_h/2 - r_d \cos\alpha) - \{t/\cos\alpha - (Z_D + t\tan\alpha)\sin\alpha\} \quad (4)$$

In the above formula (7), $Z_D$ is a distance between a radially outer edge 10ab of the end portion 10a on the first side S1 of the workpiece 10 and the contact point C between the workpiece 10 and the second R surface R2. The second condition formula represents that a radially inner edge 10aa of the end portion 10a of the workpiece 10 is located inside an outer edge of the protruding portion 22 in the radial direction at the start of the second step.

Formula (7) will be further described. As shown in FIG. 9, a first term of $(D_h/2-r_d \cos\alpha)$ on the right side is a distance from the center line CL to the contact point C in the radial direction. A second term of $\{t/\cos\alpha-(Z_D+t\times\tan\alpha)\sin\alpha\}$ on the right side is a distance between the edge 10aa of the workpiece 10 and the contact point C in the radial direction. Therefore, the entire right side of Formula (7) represents a distance from the center line CL to the edge 10aa of the workpiece 10 in the radial direction.

As shown in FIGS. 9 and 10, the distance $Z_D$ between the edge 10ab of the workpiece 10 and the contact point C is expressed as $Z_D=(D_{bo}-D_h)/2+2\pi r_d \times (90°-\alpha)/360°$. A first term of $(D_{bo}-D_h)/2$ on the right side is a distance in the radial direction between the edge 10ab and the contact point Cs between the workpiece 10 and the second R surface R2 at the start of the first step (refer to FIG. 4). A second term of $2\pi r_d \times (90°-\alpha)/360°$ on the right side is a distance between the point Cs and the contact point C. $(90°-\alpha)$ is an angle at which the workpiece 10 is inclined from the start of the first step until the inclination angle θ reaches the angle α, and $2\pi r_d \times (90°-\alpha)/360°$ is a length of a circular arc with the radius $r_d$ corresponding to the angle. In addition, as shown in FIG. 5, regarding the diameter $D_h$, for example, a relationship of $D_h/2=D_d/2+¾\times W_W \sin\alpha+r_d \cos\alpha$ is established. In this case, the diameter $D_h$ is expressed as $D_h=D_d 3/2\times W_W \sin\alpha+2r_d \cos\alpha$.

Functions and Effects

In the method for manufacturing the bearing ring member 1 according to the embodiment, the punch 20 has the first R surface R1 formed in a circular arc shape in a cross section parallel to the direction DR, and the die 30 has the second R surface R2 formed in a circular arc shape in a cross section parallel to the direction DR, and the tapered surface 31 that is formed on the second side S2 of the second R surface R2 and that is inclined to approach the center side in the radial direction as the tapered surface 31 extends toward the second side S2. In the inversion step, after the first step of deforming the workpiece 10 using the punch 20 and the die 30 in a state where the first R surface R1 and the second R surface R2 are in contact with the workpiece 10 is performed, the second step of deforming the workpiece 10 using the punch 20 and the die 30 in a state where the first R surface R1 and the tapered surface 31 are in contact with the workpiece 10 is performed. Since the punch 20 and the die 30 have simple shapes or a combination shape thereof in such a manner, whether or not inversion working can be satisfactorily performed can be determined in advance based on geometric calculations. Therefore, according to the method for manufacturing the bearing ring member 1, the design and manufacture of the bearing ring member 1 can be facilitated. In addition, the design of the punch 20 and the die 30 can be facilitated, and the difference caused by designers can be reduced. In addition, the number of designers can be increased, and the load can be distributed therebetween. In addition, work efficiency can be improved, and trial production costs can be reduced.

The above formulas (5) and (6) are satisfied at the time that the inclination angle θ of the workpiece 10 with respect to the direction DR is 30 degrees. Accordingly, the occurrence of the biting of the punch 20 into the workpiece 10 while the workpiece 10 is caught on the die 30 can be suppressed, and the inversion working of the workpiece 10 can be satisfactorily performed.

At the start of the second step, the radially inner edge 10aa of the end portion 10a on the first side S1 of the workpiece 10 is located inside the outer edge of the protruding portion 22 of the punch 20 in the radial direction. Accordingly, the workpiece 10 can be reliably pushed in by the protruding portion 22, and the inversion working of the workpiece 10 can be satisfactorily performed.

The above formula (7) is satisfied at the start of the second step. Accordingly, the workpiece 10 can be reliably pushed in by the protruding portion 22 of the punch 20, and the inversion working of the workpiece 10 can be satisfactorily performed.

[Modification Examples]

In the embodiment, sliding occurs between the workpiece 10 and the second R surface R2 within a range where the inclination angle of the workpiece 10 is decreased to less than 30 degrees in the first step; however, as a first modification example, sliding may not occur between the workpiece 10 and the second R surface R2 throughout the first step. In the first modification example as well, similarly to the embodiment, the manufacture of the bearing ring member 1 can be facilitated. Whether or not sliding occurs can be determined using a predicted value M of a limiting bending moment of the workpiece 10 to be described below.

When a bending moment (maximum bending moment) acting on the workpiece 10 is smaller than the predicted value M of the limiting bending moment of the workpiece 10 calculated by the following formula (8), no sliding occurs between the workpiece 10 and the die 30, and the workpiece 10 stands up without sliding on the die 30 in the first step.

$$M = \frac{W_W \times t^2}{4} Y \quad (8)$$

In the above formula (8), Y is the yield stress of the workpiece 10. The yield stress is stress that determines whether or not plastic deformation occurs in the material, and as described above. $W_W$ is the width of the workpiece 10, and t is the thickness of the workpiece 10. When stress larger than the yield stress acts, the material undergoes plastic deformation, and stress smaller than the yield stress acts, the material undergoes elastic deformation. Formula (4) is described, for example, in Hideaki Kudo's "Fundamental Mechanical Engineering Complete Book 3: Plasticity", published by Morikita Publishing Co. Ltd., First edition, first printing on May 15, 1968, and First edition, 18th printing on Mar. 3, 1995. For example, a bending moment acting on the workpiece 10 can be theoretically calculated by calculating a strain generated in the workpiece 10 from the amount of change in the width of the workpiece 10 in the inversion step, calculating a stress from the strain, calculating an energy from the stress, and calculating a bending moment from the energy.

Figure 11:
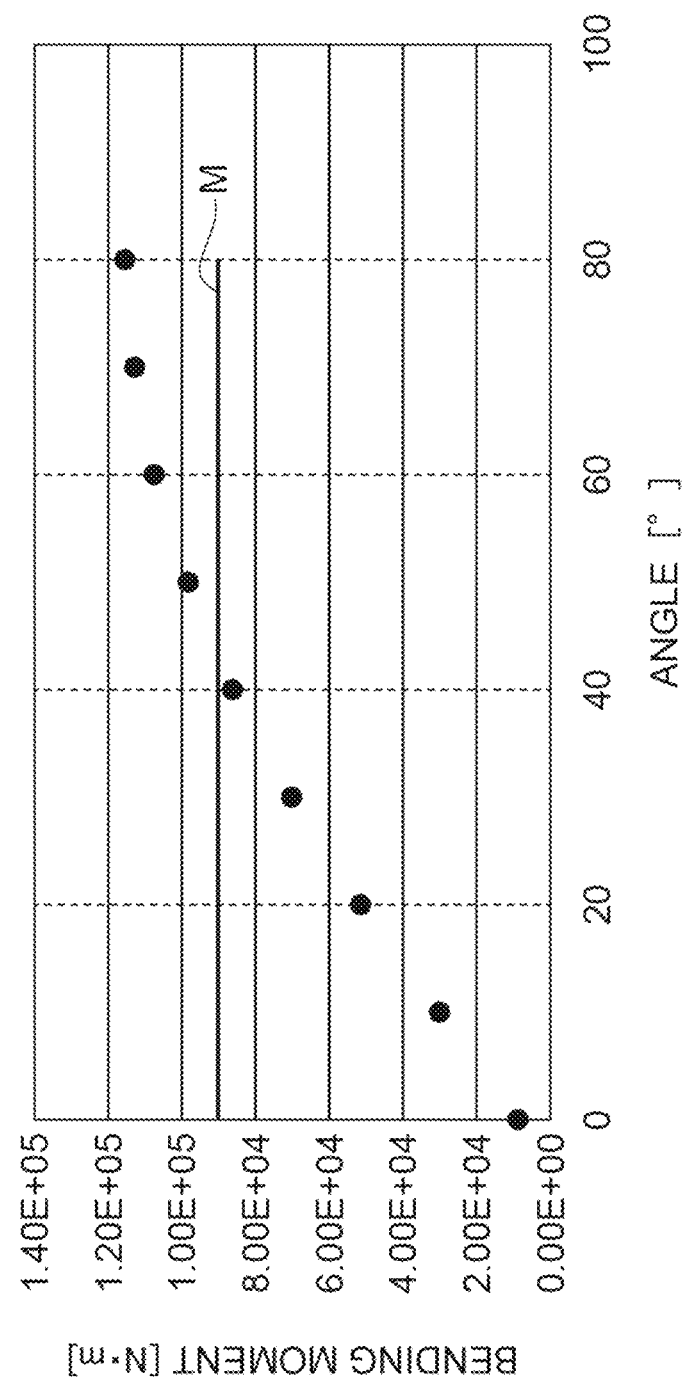
FIG. 11 is a graph showing an example of a bending moment acting on the workpiece in an inversion step.

FIG. 11 is a graph showing an example of the bending moment acting on the workpiece 10 in the inversion step. The horizontal axis in FIG. 11 represents the inclination angle θ (°) of the workpiece 10 with respect to a horizontal direction (direction perpendicular to the axial direction), and the vertical axis represents the bending moment (N·m) acting on the workpiece 10. As shown in FIG. 11, in this example, the bending moment is smaller than the predicted value M of the limiting bending moment within a range where the inclination angle θ is 0 degrees or more and approximately 40 degrees or less. In this case, no sliding occurs between the workpiece 10 and the die 30 within this range.

In order to satisfactorily perform inversion working of the workpiece 10, the workpiece 10 needs to start sliding with respect to the die 30 within a range where the bending moment acting on the workpiece 10 is smaller than the predicted value M of the limiting bending moment. In the first modification example, the bending moment (maximum bending moment) acting on the workpiece member 10 in the first step is smaller than the predicted value M of the limiting bending moment of the workpiece 10. In other words, the shapes of the punch 20 and the die 30 are determined such that the bending moment acting on the workpiece 10 in the first step becomes smaller than the predicted value M. Accordingly, in the first step, no sliding occurs between the workpiece 10 and the second R surface R2 of the die 30, and the workpiece can be satisfactorily stood up. In the second step, the workpiece 10 slides on the tapered surface 31 of the die 30, and the workpiece 10 can be reliably drawn into the inside of the die 30.

Figure 12:
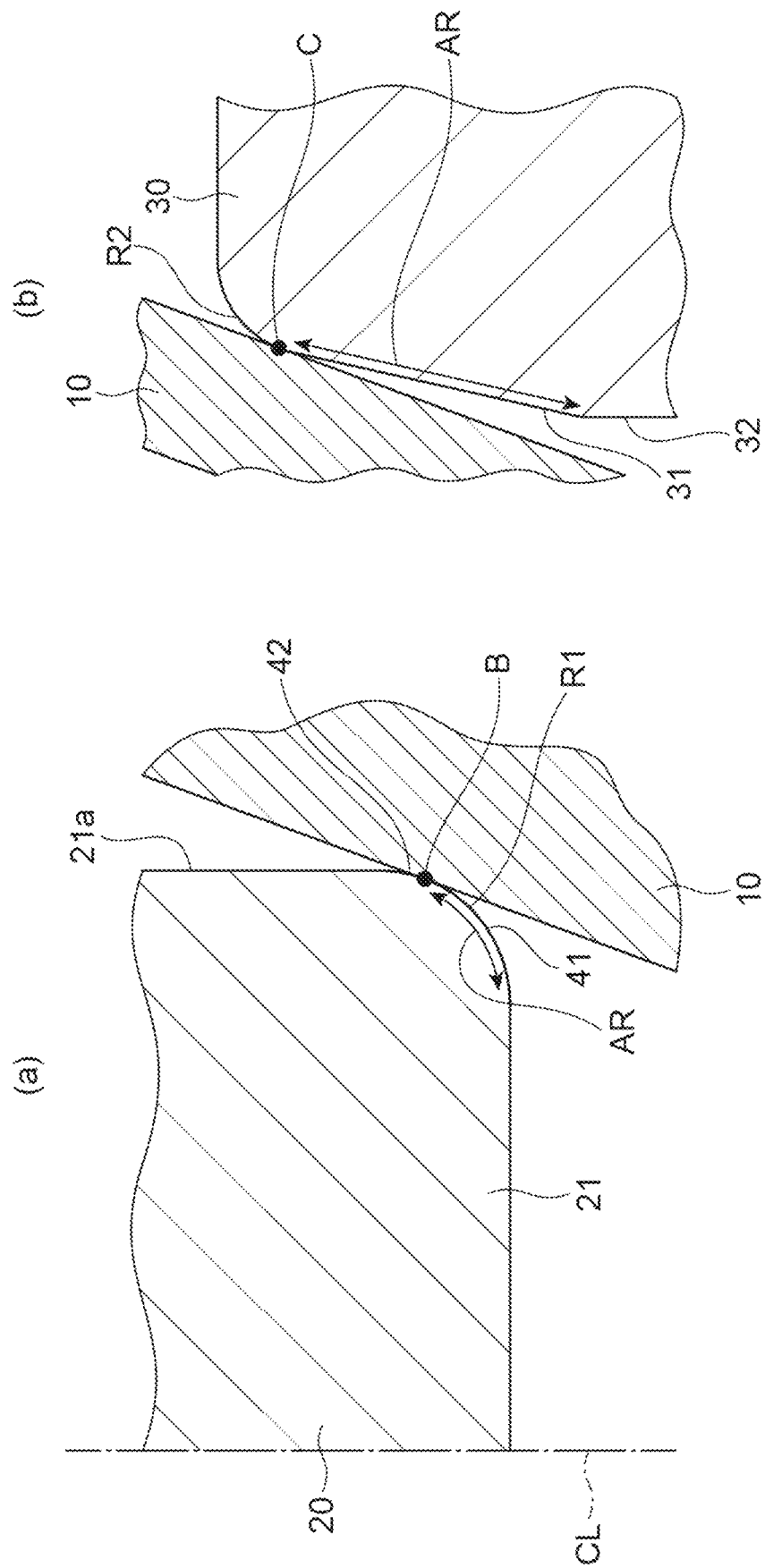
FIG. 12 is a view showing a second modification example.

FIG. 12 is a view showing a second modification example, FIG. 12(a) is a cross-sectional view of the punch 20 and the workpiece 10 at the start of the second step, and FIG. 12(b) is a cross-sectional view of the die 30 and the workpiece 10 at the start of the second step. In the punch 20 of the second modification example, a first region 41 of the first R surface R1, which comes into contact with the workpiece 10 in the second step, is roughened. In FIG. 12(a), the range of the roughened first region 41 is indicated by arrow AR. Accordingly, a surface roughness of the first region 41 is larger than a surface roughness of a second region 42 of the first R surface R1 other than the first region 41. The surface roughness is an arithmetic average roughness Ra (JIS B 0601 4.2.1). The second region 42 and the outer peripheral surface 21a may be ground surfaces subjected to grinding or lapped surfaces subjected to lapping in order to improve sliding.

In addition, in the die 30 of the second modification example, the tapered surface 31 is roughened. In FIG. 12(b), the range of the roughened tapered surface 31 is indicated by arrow AR. Accordingly, a surface roughness of the tapered surface 31 is larger than a surface roughness of the second R surface R2. The second R surface R2 and the inner peripheral surface 32 may be ground surfaces subjected to grinding or lapped surfaces subjected to lapping in order to improve sliding.

In the second modification example, inversion working is performed in a state where the surface roughness of the first region 41 is larger than the surface roughness of the second region 42 and the surface roughness of the tapered surface 31 is larger than the surface roughness of the second R surface R2. In the second modification example as well, similarly to the embodiment, the manufacture of the bearing ring member 1 can be facilitated. In addition, depending on the size of the workpiece 10, the punch 20 may be likely to bite into the workpiece 10; however, by performing inversion working in the above-described state, the occurrence of biting can be reliably suppressed, and inversion working can be satisfactorily performed.

A method for manufacturing the bearing ring member 1 according to the second modification example may include a step of polishing at least one of the punch 20 and the die 30 to obtain the above-described state, before the inversion step. For example, when the punch 20 is worn due to inversion working being repeatedly performed, and biting is about to occur, the second region 42 of the punch 20 may be polished. Alternatively, when the die 30 is worn and biting is about to occur, the second R surface R2 of the die 30 may be polished. Accordingly, it is possible to suppress a situation where the above-described state is no longer satisfied due to wear of at least one of the punch 20 and the die 30, thereby causing a biting defect. In the second modification example, both the first condition that the surface roughness of the first region 41 is larger than the surface roughness of the second region 42 and the second condition that the surface roughness of the tapered surface 31 is larger than the surface roughness of the second R surface R2 are satisfied; however, inversion working may be performed in a state where only one of the first condition and the second condition is satisfied.

Figure 13:
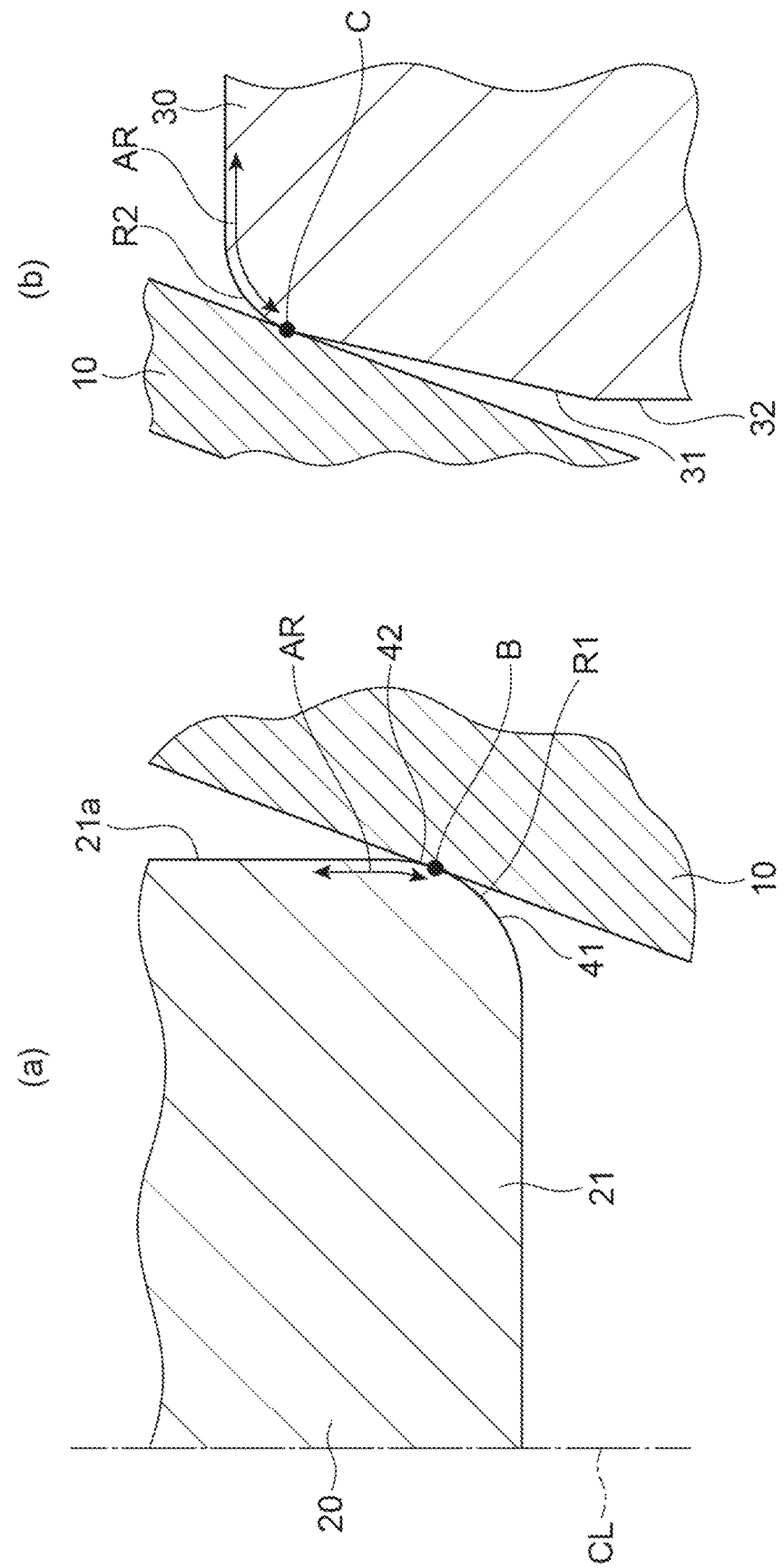
FIG. 13 is a view showing a third modification example.

FIG. 13 is a view showing a third modification example, FIG. 13(a) is a cross-sectional view of the punch 20 and the workpiece 10 at the start of the second step, and FIG. 13(b) is a cross-sectional view of the die 30 and the workpiece 10 at the start of the second step. In the punch 20 of the third modification example, the second region 42 of the first R surface R1 and a part of the outer peripheral surface 21a, which is continuous with the second region 42, are roughened. In FIG. 13(a), the roughened range is indicated by arrow AR. Accordingly, a surface roughness of the second region 42 is larger than a surface roughness of the first region 41. In the third modification example, the first region 41 and portions of the outer peripheral surface 21a other than the above-described part may be ground surfaces subjected to grinding or lapped surfaces subjected to lapping in order to improve sliding.

In addition, in the die 30 of the third modification example, a region including the second R surface R2 is roughened. In FIG. 13(b), the roughened range is indicated by arrow AR. Accordingly, a surface roughness of the second R surface R2 is larger than a surface roughness of the tapered surface 31. In the third modification example, the tapered surface 31 and the inner peripheral surface 32 may be ground surfaces subjected to grinding or lapped surfaces subjected to lapping in order to improve sliding.

In the third modification example, inversion working is performed in a state where the surface roughness of the second region 42 is larger than the surface roughness of the first region 41 and the surface roughness of the second R surface R2 is larger than the surface roughness of the tapered surface 31. In the third modification example as well, similarly to the embodiment, the manufacture of the bearing ring member 1 can be facilitated. In addition, depending on the size of the workpiece 10, it may be difficult to push the workpiece 10 in by using the protruding portion 22 of the punch 20; however, by performing inversion working in the above-described state, the occurrence of a push-in failure can be reliably suppressed, and inversion working can be satisfactorily performed.

A method for manufacturing the bearing ring member 1 according to the third modification example may include a step of polishing at least one of the punch 20 and the die 30 to obtain the above-described state, before the inversion step. For example, when the punch 20 is worn due to inversion working being repeatedly performed, and a push-in failure is about to occur, the first region 41 of the punch 20 may be polished. Alternatively, when the die 30 is worn and a push-in failure is about to occur, the tapered surface 31 of the die 30 may be polished. Accordingly, it is possible to suppress a situation where the above-described state is no longer satisfied due to wear of at least one of the punch 20 and the die 30, thereby causing a defect. In the third modification example, both the first condition that the surface roughness of the second region 42 is larger than the surface roughness of the first region 41 and the second condition that the surface roughness of the second R surface R2 is larger than the surface roughness of the tapered surface 31 are satisfied; however, inversion working may be performed in a state where only one of the first condition and the second condition is satisfied.

Figure 14:
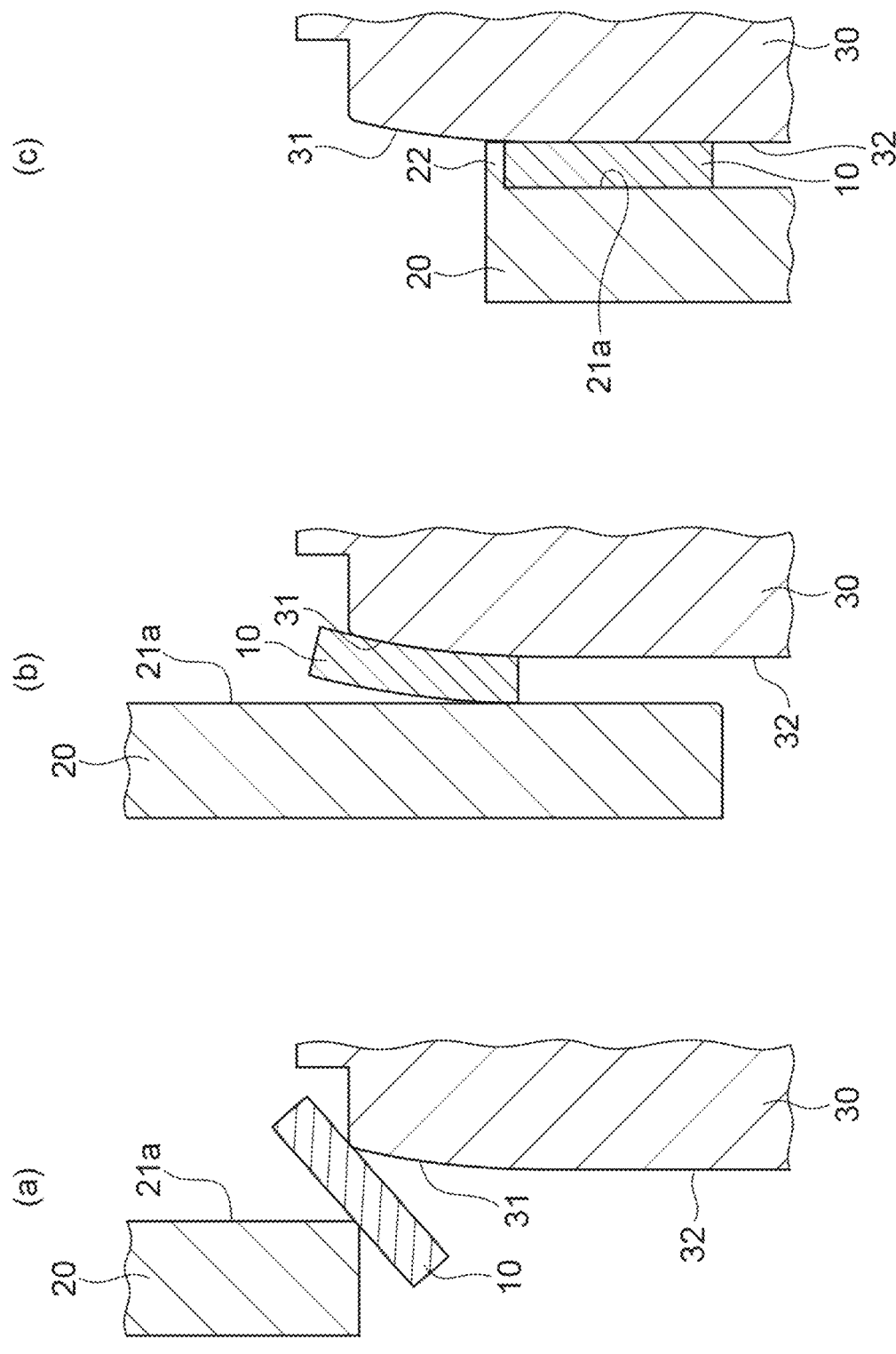
FIGS. 14(a), 14(b), and 14(c) are cross-sectional views for describing ironing.

As a fourth modification example, the inversion step may further include a third step of applying ironing to the workpiece 10 by sandwiching the workpiece 10 between the outer peripheral surface 21a of the punch 20 and the inner peripheral surface 32 of the die 30 after second step. FIG. 14 is a cross-sectional view for describing ironing. In FIG. 14, the first R surface R1, the second R surface R2, and the like are omitted.

As one example, a gap (gap in the radial direction) between the outer peripheral surface 21a and the inner peripheral surface 32 in the third step may be set to be equal to the thickness of the workpiece 10. In normal inversion working, the thickness of the radially inner portion of the workpiece 10 decreases, and the thickness of the radially outer portion increases. By setting the gap between the outer peripheral surface 21a and the inner peripheral surface 32 to be equal to the thickness of the workpiece 10 as in this example, the workpiece 10 can be squeezed (made thinner) on a radially outer side on which the thickness increases, and the thickness of the bearing ring member 1 obtained after processing can be matched to the thickness of the workpiece 10.

As another example, the gap between the outer peripheral surface 21a and the inner peripheral surface 32 in the third step may be set to be smaller than the thickness of the workpiece 10. For example, the gap may be set to be equal to the thickness of the radially inner portion of the workpiece 10 after normal inversion working. In this case, the thickness of the bearing ring member 1 obtained after processing can be matched to the thickness of the radially inner portion of the workpiece 10, of which the thickness decreases.

In the fourth modification example as well, similarly to the embodiment, the manufacture of the bearing ring member 1 can be facilitated. In addition, by performing ironing between the outer peripheral surface 21*a* of the punch 20 and the inner peripheral surface 32 of the die 30, the roundness of the obtained bearing ring member 1 can be improved.

The present disclosure is not limited to the embodiment and the modification examples. In the embodiment, both the first condition formula regarding biting and the second condition formula regarding push-in failure are satisfied; however, only one of the first condition formula and the second condition formula may be satisfied. In the inversion step of the embodiment, as the punch 20 descends and approaches the die 30, the workpiece 10 is sandwiched between the punch 20 and the die 30; however, the punch 20 and the die 30 may move relative to each other, and for example, the workpiece 10 may be sandwiched between the punch 20 and the die 30 by moving both members closer to each other.

In the embodiment, the punch 20 (main body portion 21) is formed in a substantially columnar shape, and the die 30 is formed in a substantially cylindrical shape; however, on the contrary, the punch 20 (main body portion 21) may be formed in a substantially cylindrical shape, and the die 30 may be formed in a substantially columnar shape. In this case, the first R surface R1 is formed at an inner edge portion of the surface on the second side S2 of the main body portion 21 of the punch 20. In the die 30, the second R surface R2 is formed at an outer edge portion of the surface on the first side S1 of the die 30. The tapered surface 31 is inclined to approach the center side in the radial direction as the tapered surface 31 extends toward the first side S1 (away from the center in the radial direction as the tapered surface 31 extends toward the second side S2). Namely, the tapered surface 31 may be inclined with respect to the direction DR (predetermined direction).

REFERENCE SIGNS LIST

1: bearing ring member, 10: workpiece, 10*a*, 10*b*: end portion, 10*aa*, 10*ab*, 10*ba*: edge, 20: punch (mold for inversion working), 21: main body portion, 21*a*: outer peripheral surface, 22: protruding portion, 30: die (mold for inversion working), 30*a*: opening, 31: tapered surface, 32: inner peripheral surface, 41: first region, 42: second region, DR: direction (predetermined direction), R1: first R surface, R2: second R surface, S1: first side, S2: second side.

The invention claimed is:

1. A method for manufacturing a bearing ring member having a cylindrical shape, the method comprising:
an inversion step of deforming a workpiece having an annular shape by sandwiching the workpiece between a punch disposed on a first side of the workpiece and a die disposed on a second side of the workpiece opposite to the first side in a predetermined direction in which the punch and die are configured to move relative to each other,
wherein the punch includes a first R surface formed in a circular arc shape in a cross section parallel to the predetermined direction,
the die includes a second R surface formed in a circular arc shape in a cross section parallel to the predetermined direction, and a tapered surface formed on the second side of the second R surface and inclined with respect to the predetermined direction, and the inversion step includes a first step of deforming the workpiece using the punch and the die in a state where the first R surface and the second R surface are in contact with the workpiece, and a second step of deforming the workpiece using the punch and the die in a state where the first R surface and the tapered surface are in contact with the workpiece, after the first step.

2. The method for manufacturing a bearing ring member according to claim 1,
wherein in the first step, no sliding occurs between the workpiece and the second R surface, and
in the second step, sliding occurs between the workpiece and the tapered surface.

3. The method for manufacturing a bearing ring member according to claim 1,
wherein a bending moment acting on the workpiece in the first step is smaller than a predicted value M of a limiting bending moment of the workpiece calculated using Formula (1), $$M = \frac{W_W \times t^2}{4} Y \quad (1)$$

in Formula (1), $W_W$ is a width of the workpiece, t is a thickness of the workpiece, and Y is a yield stress of the workpiece.

4. The method for manufacturing a bearing ring member according to claim 1,
wherein an inclination angle of the tapered surface with respect to the predetermined direction is smaller than 30 degrees, and
Formula (2) is satisfied at a time that an inclination angle θ of the workpiece with respect to the predetermined direction is 30 degrees, $$Z_d < W_W \times A \quad (2)$$

in Formula (2), $Z_d$ is a distance between a radially inner edge of an end portion on the second side of the workpiece and a contact point between the workpiece and the first R surface, $W_W$ is a width of the workpiece, and A is a constant of 0.2 or more and 0.6 or less.

5. The method for manufacturing a bearing ring member according to claim 1,
wherein the punch includes a main body portion having a columnar shape on which the first R surface is formed,
an inclination angle of the tapered surface with respect to the predetermined direction is smaller than 30 degrees, and
Formula (3) is satisfied at a time that an inclination angle θ of the workpiece with respect to the predetermined direction is 30 degrees, $$\{(D_p/2 - r_p) - d_{bi}/2\} + 2\pi r_p \frac{90° - \theta}{360°} < \frac{D_{bo} - d_{bi}}{2} \times A \quad (3)$$

in Formula (3), $D_p$ is a diameter of the main body portion, $r_p$ is a radius of first R surface, $d_{bi}$ is an inner diameter of the workpiece, $D_{bo}$ is an outer diameter of the workpiece, and A is 2/5.

6. The method for manufacturing a bearing ring member according to claim 1, wherein the punch includes a main body portion having a columnar shape on which the first R surface is formed, and a protruding portion formed on the first side of the main body portion and protruding outward in a radial direction with respect to the main body portion, and at a start of the second step, a radially inner edge of an end portion on the first side of the workpiece is located inside an outer edge of the protruding portion in the radial direction.

7. The method for manufacturing a bearing ring member according to claim 1, wherein the punch includes a main body portion having a columnar shape on which the first R surface is formed, and a protruding portion formed on the first side of the main body portion and protruding outward in a radial direction with respect to the main body portion, and Formula (4) is satisfied at a start of the second step, $$D_{pL}/2 > (D_h/2 - r_d \cos\alpha) - \{t/\cos\alpha - (Z_D + t\tan\alpha)\sin\alpha\} \quad (4)$$

in Formula (4), $D_{pL}$ is a diameter of the protruding portion, $D_h$ is a diameter of an opening of the die defined by the second R surface, $r_d$ is a radius of the second R surface, $\alpha$ is an inclination angle of the tapered surface with respect to the predetermined direction, t is a thickness of the workpiece, and $Z_D$ is a distance between a radially outer edge of an end portion on the first side of the workpiece and a contact point between the workpiece and the second R surface.

8. The method for manufacturing a bearing ring member according to claim 1, wherein the inversion step is performed in a state where a surface roughness of a first region of the first R surface, which comes into contact with the workpiece in the second step, is larger than a surface roughness of a second region of the first R surface other than the first region.

9. The method for manufacturing a bearing ring member according to claim 1, wherein the inversion step is performed in a state where a surface roughness of the tapered surface is larger than a surface roughness of the second R surface.

10. The method for manufacturing a bearing ring member according to claim 1, wherein the inversion step is performed in a state where a surface roughness of a first region of the first R surface, which comes into contact with the workpiece in the second step, is larger than a surface roughness of a second region of the first R surface other than the first region and a surface roughness of the tapered surface is larger than a surface roughness of the second R surface.

11. The method for manufacturing a bearing ring member according to claim 1, wherein the inversion step is performed in a state where a surface roughness of a second region of the first R surface other than a first region which comes into contact with the workpiece in the second step is larger than a surface roughness of the first region of the first R surface.

12. The method for manufacturing a bearing ring member according to claim 1, wherein the inversion step is performed in a state where a surface roughness of the second R surface is larger than a surface roughness of the tapered surface.

13. The method for manufacturing a bearing ring member according to claim 1, wherein the inversion step is performed in a state where a surface roughness of a second region of the first R surface other than a first region which comes into contact with the workpiece in the second step is larger than a surface roughness of the first region of the first R surface and a surface roughness of the second R surface is larger than a surface roughness of the tapered surface.

14. The method for manufacturing a bearing ring member according to claim 8, further comprising a step of polishing at least one of the punch and the die to obtain the state where the surface roughness of the first region of the first R surface is larger than the surface roughness of the second region of the first R surface, before the inversion step.

15. The method for manufacturing a bearing ring member according to claim 1, wherein the punch further includes an outer peripheral surface formed on the first side of the first R surface, the die further includes an inner peripheral surface formed on the second side of the tapered surface, and the inversion step further includes a third step of applying ironing to the workpiece by sandwiching the workpiece between the outer peripheral surface and the inner peripheral surface after the second step.

16. The method for manufacturing a bearing ring member according to claim 15, wherein a gap between the outer peripheral surface and the inner peripheral surface in the third step is set to be equal to a thickness of the workpiece.

17. The method for manufacturing a bearing ring member according to claim 15, wherein a gap between the outer peripheral surface and the inner peripheral surface in the third step is set to be smaller than a thickness of the workpiece.

18. The method for manufacturing a bearing ring member according to claim 1, wherein the tapered surface is inclined to approach a center side in a radial direction as the tapered surface extends toward the second side.

* * * * *